United States Patent

Kolbe

Patent Number: 6,053,124
Date of Patent: Apr. 25, 2000

[54] APPARATUS FOR FEEDING GRANULATED FEED SUPPLEMENTS TO LIVESTOCK

[76] Inventor: William J. Kolbe, 521 Mottsville La., Gardnerville, Nev. 89410

[21] Appl. No.: 09/270,425

[22] Filed: Mar. 16, 1999

[51] Int. Cl.$^7$ .................................................... A01K 5/00
[52] U.S. Cl. ......................................................... 119/51.01
[58] Field of Search ............................... 119/51.01, 51.03, 119/51.5, 52.1, 52.4, 53, 53.5, 54, 56.1

[56] References Cited

U.S. PATENT DOCUMENTS

| | | | |
|---|---|---|---|
| 3,340,851 | 9/1967 | Frank et al. | 119/52.1 |
| 3,780,701 | 12/1973 | Wentworth, Sr. | 119/52.1 |
| 3,935,838 | 2/1976 | Johnson . | |
| 4,023,533 | 5/1977 | Mann . | |
| 4,270,489 | 6/1981 | Joronen | 119/51.03 |
| 4,303,040 | 12/1981 | Mann . | |
| 4,324,202 | 4/1982 | Stonestreet et al. . | |
| 4,363,291 | 12/1982 | Harmsen . | |
| 5,056,467 | 10/1991 | Schaefer . | |
| 5,201,279 | 4/1993 | Impastato et al. . | |
| 5,630,375 | 5/1997 | Mann . | |
| 5,839,389 | 11/1998 | Fujii | 119/53 |
| 5,850,805 | 12/1998 | Kleinsasser | 119/54 |
| 5,860,390 | 1/1999 | Payne . | |

Primary Examiner—Thomas Price
Attorney, Agent, or Firm—Gregory Garmong

[57] ABSTRACT

An apparatus for dispensing granulated edible material to a large animal, such as a cow, a horse, or a sheep, has a housing with a tongue opening in the sidewall. A bin is located within the housing, and a downwardly oriented chute extends from a bottom of the bin. A dispensing assembly includes a stopper assembly having a stopper sized to close the chute when the stopper assembly is in a first lowered position and to allow granulated edible material to flow through the chute when the stopper assembly is in a second raised position, and an actuating block affixed to the stopper assembly at a location whereat the actuating block is accessible to the tongue of the animal when the tongue extends through the opening in the housing and the tongue may move the actuating block such that the stopper assembly moves from the first position to the second position. The actuating block has a recess in an upper side thereof positioned to receive the granulated edible material which falls through the chute, and a flow passage extending from the recess, through an interior of the actuating block, and to an exterior opening in the actuating block. In operation of the dispensing apparatus, the animal's tongue extending through the tongue opening may move the actuating block such that the dispensing rod moves from the lowered position to the raised position. The stopper is thereby moved, allowing granulated edible material to fall from the bin, through the flow passage in the actuating block, and onto the tongue of the animal.

20 Claims, 3 Drawing Sheets

APPARATUS FOR FEEDING GRANULATED FEED SUPPLEMENTS TO LIVESTOCK

BACKGROUND OF THE INVENTION

This invention relates to an animal feeder, and, more particularly, to an animal feeder for dispensing trace minerals and other edible granulated materials to large animals.

Large farm and ranch animals consume bulk feed in the form of grass, hay, and/or grain. In addition, they may be fed supplements that make up for specific dietary deficiencies of "trace minerals" in the bulk feed. Although termed "trace minerals" in the art because the amounts fed are relatively small, they are vital to the diet because deficiencies in these trace minerals may cause significant problems to the animals. The deficiencies vary from region to region. For example, selenium and copper are typical trace minerals that must be fed as supplements in some regions. The required trace minerals are usually determined by chemically testing the bulk feed and the soil, and comparing the results with the recommended feeding requirements of the animals. The rancher purchases custom-blended supplements that contain the required trace minerals for that region, and offers the supplements to the animals.

A variety of techniques are known for supplying and feeding the supplement containing the trace minerals to the animals. Typically, the trace minerals are mixed with inert matter and made available to the animals for consumption on an as-desired basis. In one common approach, a block containing the trace minerals is placed into the feeding area of the animals, and the animals lick the block to consume the trace minerals. In another, the trace minerals in the form of a granulated material are placed into a ground feeder, such as a tractor tire lying on the ground with a base to prevent the scattering of the granulated material, and made available to the animals. Enclosed gravity-fed bins and mechanized feeders that employ augurs or other solids-dispensing mechanisms are sometimes used. Liquid supplement feeders are also available.

The available feeding techniques have drawbacks when used to feed supplements to animals in open-range conditions. Lick blocks, ground feeders, and many other types of feeders are subject to loss of the supplement due to a variety of adverse conditions, such as water and wind erosion, being kicked over by the animals, intrusion of foreign matter, and other causes. They may be useful in protected feedlots but are not practical for use in open-range conditions. Ranchers feeding supplements to cattle in the rangeland of the western United States expect to lose about 20 percent of the supplement to such causes, when using conventional feeders. Lick blocks are also somewhat limited in the choice of the trace minerals fed, and are typically limited to feeding salt. Available gravity-fed bins for granulated supplements are subject to clogging and caking and may not supply the trace minerals in a manner that ensures their proper consumption. Mechanized feeders are not practical for feeding in open-range conditions where electrical or other power is not available. Liquid supplement feeders are subject to leaking in conditions of rough usage, such as encountered in open-range conditions. Many of the available feeders are also subject to damage by the animals during normal field conditions.

Accordingly, there is a need for a feeder for granulated supplements to large farm animals. The present invention fulfills this need, and further provides related advantages.

SUMMARY OF THE INVENTION

The present invention provides a feeder for granulated feed supplements to large farm animals such as cattle, horses, pigs, and sheep, as well as to large wild animals. The granulated feed supplements are metered to the animals in a controlled manner so as to be directly consumed by the animals. The feeder is self-contained, actuated by the animals, and requires no power source. It is therefore suitable for feeding animals in open-range conditions. The feed supplements are kept dry and fully protected from commonly encountered adverse conditions prior to feeding. The feeder may be oriented to protect the supplements from the prevailing winds and rain. Any of the feed supplements not directly consumed by the animals are retained in the feeder for subsequent consumption or reuse. Accordingly, waste of the feed supplements is avoided. The feeder is robust and durable, and highly resistant to damage by the animals. It may be affixed to any sort of suitable stationary support.

In accordance with the invention, an apparatus for dispensing granulated edible material to an animal comprises a housing having a tongue opening in a side thereof, the tongue opening being sufficiently large to permit a tongue of the animal to extend therethrough. There is a bin within the housing, and a downwardly oriented chute in a bottom of the bin. A dispensing assembly comprises a stopper assembly including a stopper sized to close the chute when the stopper assembly is in a first position and to allow granulated edible material to flow through the chute when the stopper assembly is in a second position, and an actuating block affixed to the stopper assembly such that the actuating block is accessible to the tongue of the animal when the tongue extends through the opening in the housing and the tongue may move the actuating block such that the stopper assembly moves from the first position to the second position. As a result of this movement of the stopper assembly and the stopper, granulated material falls through the chute and onto the tongue of the animal for direct consumption by the animal. Any granulated material that does not fall directly onto the tongue of the animal falls into the bottom of the housing for later indirect consumption by the animal.

Desirably, there is a dispensing stop located above the chute, so that the movement of the stopper assembly is limited by the dispensing stop. In one form, the dispensing stop comprises a top support, a stop rod extending downwardly from the top support and vertically aligned with the stopper assembly, and an engagement between the stop rod and the top support. The engagement may be adjustable so that the stop rod may be adjusted upwardly or downwardly.

The actuating block preferably has a recess in its upper surface located below the chute, and an internal flow passage from the recess to the side or bottom of the dispensing block. The dispensed feed supplement falls from the chute into the recess when the animal moves the dispensing block with its tongue, and thence through the flow passage onto the tongue of the animal. The rotation of the actuating block is restrained so that the flow passage is maintained in the correct position for feeding. The actuating block may include a flavorant to encourage the animal to contact and move the actuating block with its tongue.

The present approach provides a robust, durable apparatus for feeding granulated supplements to large animals. The apparatus protects and conserves the supplements, so that none are lost to wind, water, or spillage. The apparatus is made with a smooth exterior that is resistant to rubbing damage by the animals. Only the tongue of the animal may contact the dispensing assembly, which is thereby protected against damage. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
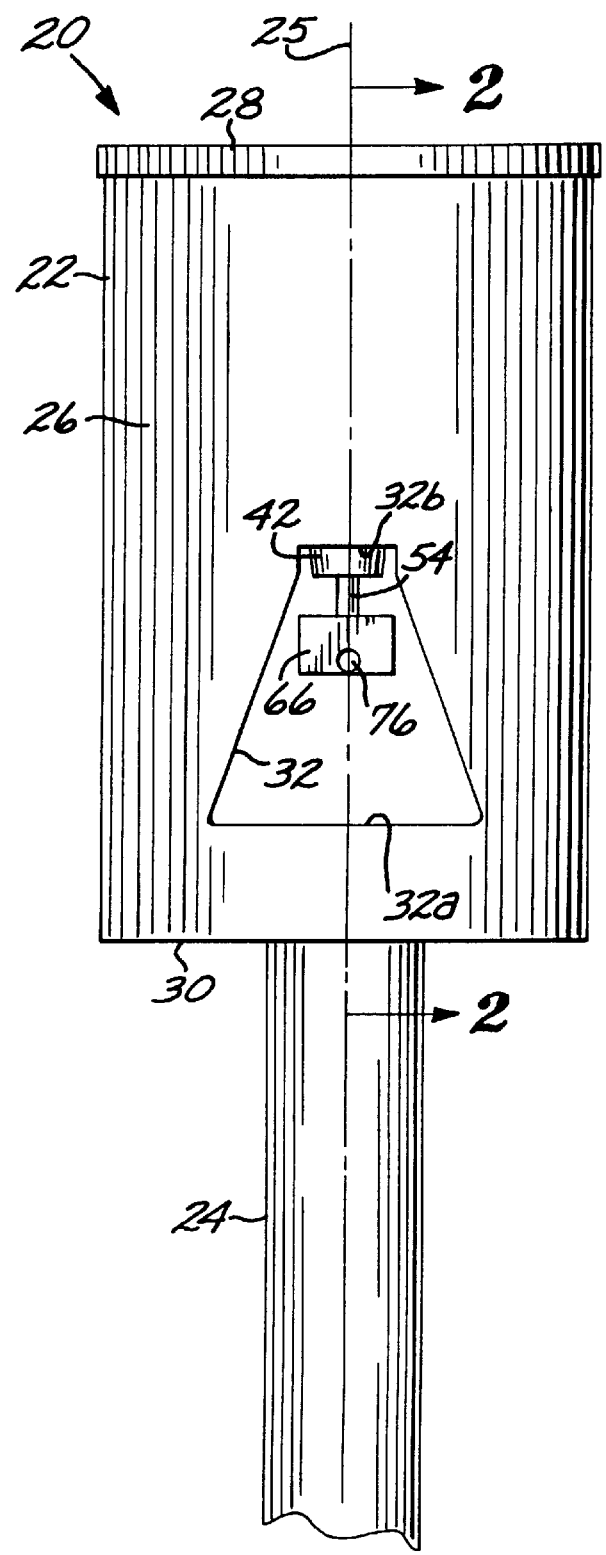
FIG. 1 is an external view of a feeder apparatus in accordance with the invention.

FIG. 1 is an exterior view of a feeder apparatus 20 for dispensing granulated edible material to large domesticated animals, such as cattle, horses, pigs, sheep, and buffalo. It may also be used to dispense granular edible material to wild animals such as deer and elk. The apparatus 20 includes a housing 22 that is affixed to an external support 24 at a height convenient to the animals to be fed. The external support 24 may be of any operable type, such as a post, a corner of a building, or a tree.

The housing 22 preferably, but not necessarily, is generally cylindrical in form with an axis of elongation 25 of the housing 22 extending vertically. The preferred housing 22 includes a cylindrical side 26, a removable top 28, and a bottom 30. The housing 22 is preferably smooth on the exterior, with no projections against which the animals may rub. The side 26 has a tongue opening 32 therethrough, that is sufficiently large that the animal may reach its tongue therethrough, but not its entire head. The edges of the tongue opening 32 are broken over or rounded, so that the tongue of the animal is not cut on the edges. The tongue opening 32 is preferably generally in the form of a truncated triangle with the broad base 32a closest to the bottom 30 of the housing 22, and the narrower apex 32b above the base 32a. The apex 32b is preferably truncated or flattened. This shape of the tongue opening 32 allows only the tongue of the animal to reach the actuating block (to be discussed subsequently). Some of the nose of the animal may extend into the tongue opening 32 when the animal moves its head downwardly, so that the tongue can reach any of the granulated material that has fallen to the interior of the bottom 30. The shaping of the tongue opening 32 in this manner protects the internal structure of the apparatus 20 from damage by the animal.

Figure 2:
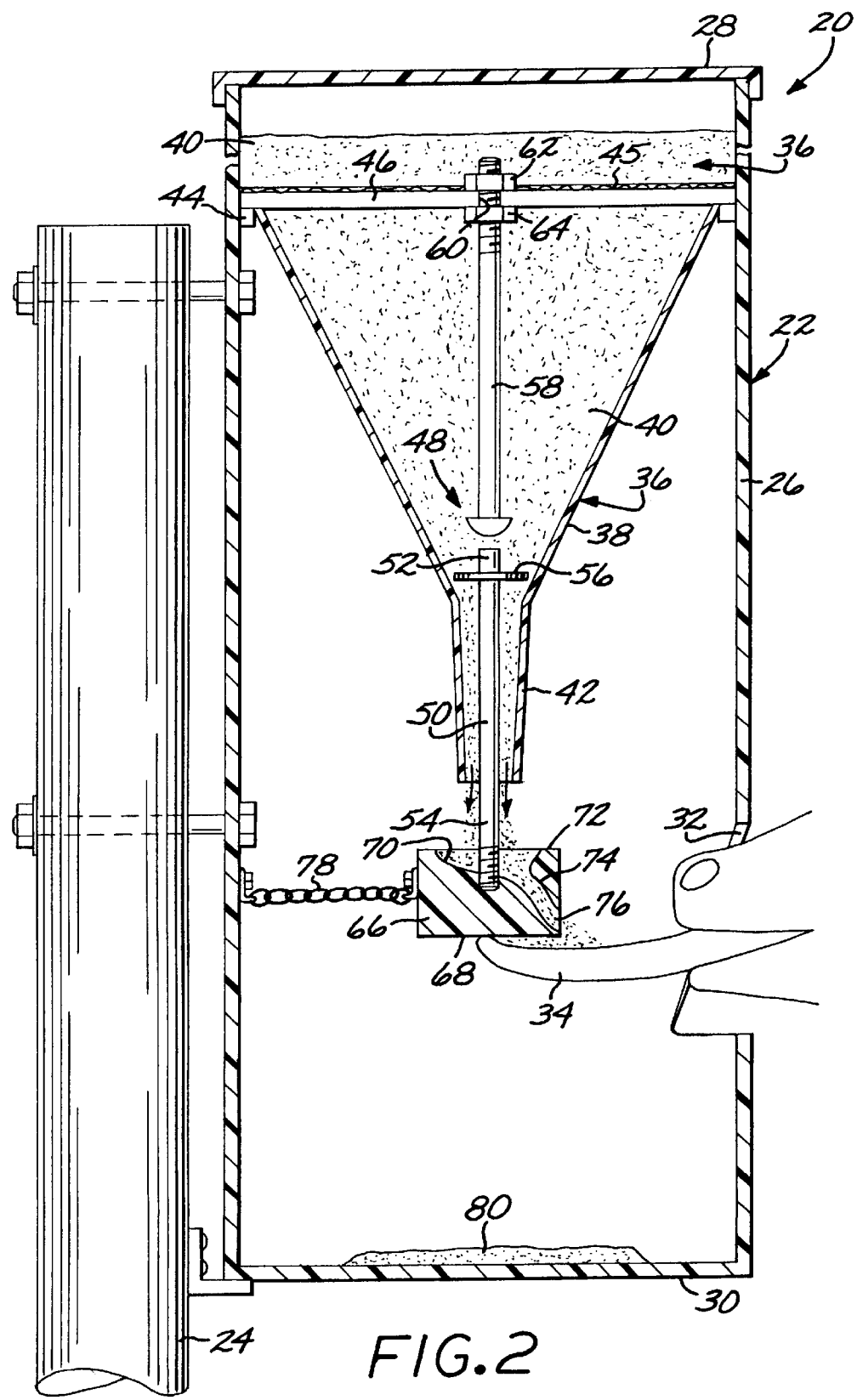
FIG. 2 is a schematic sectional view of the feeder apparatus of FIG. 1, taken along line 2—2.

FIG. 2 illustrates the interior structure of the apparatus 20, with a tongue 34 of the animal extending through the tongue opening 32. A bin 36 is located within an upper part of the housing 22, with a downwardly and inwardly sloping wall 38 to cause granular material 40 therein to feed toward a downwardly oriented chute 42 at the lower end of the bin 36. The housing 22 and thence the bin 36 may be made as tall as necessary to accommodate a desired quantity of the granular material 40. The sloping wall 38 of the bin 36 is supported in part from a rest 44 in the form of a ring affixed to the inside surface of the side 26 of the housing 22. Optionally, a screen 45 may extend across the interior of the bin 36 to prevent large chunks of granular material or foreign matter from falling into the chute 42.

A top support 46 is located above the chute 42, and preferably extends through the interior of the bin 36. The top support 46 is desirably in the form of a bar or angle shape that is supported on its opposite ends from the rest 44 affixed to the inside surface of the side 26 of the housing 22. The top support 46 is of this form, rather than a cover that extends over the entire circumference of the bin 36, to permit the flow of the granular material 40 from the portion of the bin 36 above the top support 46 toward the portion of the bin 36 below the top support 46 and eventually to the chute 42.

A dispensing assembly 48 is provided to dispense and meter the granular material 40 from the bin 36 to the tongue 34 of the animal, upon demand by the animal. The dispensing assembly 48 includes a vertically oriented dispensing rod 50 that extends vertically through the chute 42, with an upper portion 52 above the chute 42 and a lower portion 54 below the chute 42. A stopper 56 is affixed to the dispensing rod 50. The stopper 56 is sized and positioned to close the chute 42 when the dispensing rod 50 is in a first, lowered position, so that granular material 40 is retained in the bin 36. The stopper 56 is moved upwardly to allow granulated material 40 to fall from the bin 36 into the chute 42 when the dispensing rod 50 is moved upwardly to the second, raised position.

The dispensing rod 50 may be free to move without restraint. More preferably, a dispensing stop is provided, including a stop rod 58 that extends downwardly from the top support 46 and has an enlarged lower end. The stop rod 58 is aligned axially with the dispensing rod 50, so that the upward movement of the dispensing rod 50 to the second, raised position is limited by its contact with the lower end of the stop rod 58. The stop rod 58 is engaged to the top support 46, preferably by an adjustable engagement. In the preferred approach, the stop rod 58 passes through a bore 60 in the top support 46. The stop rod 58 is fastened to the top support 46 by an upper nut 62 threadably affixed to the stop rod 58 at a location above the top support 46, and a lower nut 64 threadably affixed to the stop rod 58 at a location below the top support 46. The nuts 62 and 64 may be repositioned by turning them on their threads, to adjust the vertical position of the stop rod 58 and to tighten it against the top support 46. The vertical extent of travel of the dispensing rod 50 is thereby adjustable to allow lesser or greater flow rates of granular material to pass through the chute 42 when the dispensing assembly 48 is actuated by the tongue of the animal.

An actuating block 66 is affixed to the lower portion 54 of the dispensing rod 54, preferably by a male thread on the dispensing rod and a corresponding female thread on the actuating block 66. (The dispensing rod 50, stopper 56, and actuating block 66 may together be viewed as a stopper assembly that meters the flow of the granulated material from the bin 36 through the chute 42.) The actuating block 66 is positioned so that its underside 68 may be contacted by the tongue 34 of the animal when the tongue 34 extends through the tongue opening 32. The actuating block 66 may be initially coated or impregnated with a flavorant, such a molasses, to encourage the animal to lick the underside 68 of the actuating block.

The actuating block 66 preferably includes a recess 70 in an upper side 72 thereof. The recess 70 is positioned vertically below the chute 42, so that granular material falling through the chute 42 falls into the recess 70. An internal flow passage 74 extends from the recess 70, through the interior of the actuating block 66, and to an exterior opening 76 in the actuating block. The lower end of the actuating block 66 and the exterior opening 76 are visible through the tongue opening 32 in FIG. 1.

Figure 3:
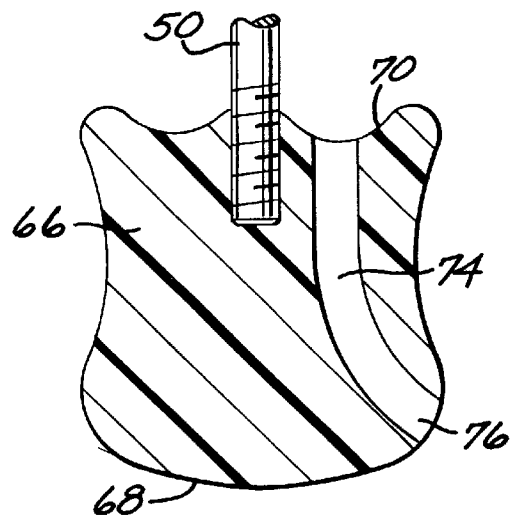
FIGS. 3–5 are sectional views of other embodiments of the actuating block.
Figure 4:
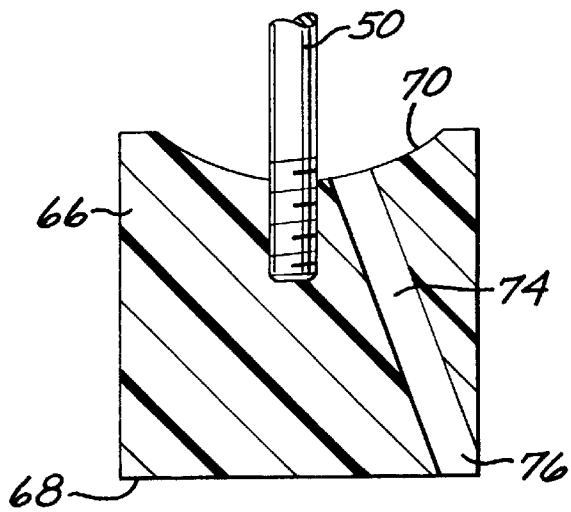
Figure 5:
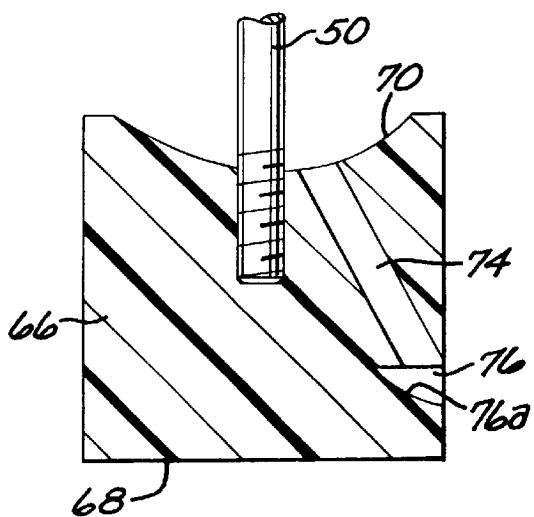

Other configurations of the actuating block 66 are operable, and some examples are illustrated in FIGS. 3–5.

The actuating block 66 of FIG. 3 has a contoured shape. The actuating block 66 of FIG. 4 has an exterior opening 76 that reaches to the underside 68 of the block. The actuating block 66 of FIG. 5 has a slot 76a into which the granular material falls prior to reaching the tongue of the animal.

A restraint, preferably in the form of a restraining link 78, extends between the inside surface of the side 26 of the housing 22 and the actuating block 66. The restraining link 78, preferably in the form of a length of light chain or rope, prevents the actuating block 66 from rotating about the vertical axis extending along the dispensing rod 50, so that the exterior opening 76 is no longer in position to dispense the granular material directly onto the tongue of the animal.

In operation, the dispensing rod 50 normally is positioned in the first or lowered position, so that the stopper 56 closes the lower end of the bin 36. When the tongue 34 of the animal licks at the underside 68 of the actuating block 66, the dispensing rod 50, with the stopper 64, is raised from the first or lowered position, to the second or raised position whose maximum extent is determined by the position of the stop rod 58. The raising of the stopper 56 opens the bottom of the bin 36, so that granular material 40 falls from the bin 36, through the chute 42, into the recess 70, through the interior flow passage 74, out the exterior opening 76, and onto the tongue 34 of the animal. Any granular material 40 that misses the tongue 34 or falls off the tongue 34 is added to a pile 80 of granular material resting on the inside surface of the bottom 30 of the housing 22. The granular material on the pile 80 is available to be indirectly consumed by the licking action of the animal. No granular material is lost to spillage, or to the environmental action of wind or moisture, because the granular material is always enclosed within the housing 22 prior to consumption. The generally triangular shape of the tongue opening 32 is sized to allow only the tongue 34 of the animal to contact the actuating block 66 and the dispensing assembly 48, yet allow more of the nose of the animal to reach into the apparatus 20 to lick the granular material in the pile 80.

The inventor built and tested three prototypes of the apparatus 20 as described above and illustrated in FIGS. 1 and 2, in his own cattle operation. For these prototypes, the housing 22 was generally cylindrical with a diameter of about 12 inches and a height between the bottom 30 and top 28 of about 40 inches. The exterior of the housing was smooth and there were no projections on the outside of the housing 22 which could be rubbed against by the cattle to damage the apparatus 20 or injure themselves. The tongue opening 32 was generally truncated triangular as illustrated in FIG. 1, with a width at the base 32a of about 10½ inches, a width at the apex 32b of about 6½ inches, and a distance from the base 32a to the apex 32b of about 14½ inches. The underside 68 of the actuating block 66 was about 10 inches above the interior of the bottom 30 of the housing. The bottom 30 of the housing 22 was positioned 18–20 inches from the ground, for the feeding of range cattle. The bin 36, which extended about 16 inches above the top support 46, was sufficiently large to hold about 50 pounds of granular supplement material 40. The stopper 56 had a diameter of about 1½ inch. The flow passage 74 of the actuating block 66 was about ⅝ inch in diameter and the exterior opening 76 was about 1 inch in diameter. These dimensions of the flow passage and the exterior opening may be set to ensure that the granular material will not cake and block the flow passage due to contact with the saliva of the animal.

The inventor used the prototypes to feed granular mineral supplement to range cattle over a period of about 3 months, beginning in December 1998. All of the cattle quickly learned to lick at the actuating block 66 to obtain the mineral supplement. To encourage the cattle to feed in this manner, the actuating block 66 was initially coated with molasses. The inventor's cattle ranching operation is located in an area which is subjected to moderately heavy winter snow, and rain in the spring and fall. The area is regularly windy, and during the testing period there were winds as high as 80 miles per hour. Substantially none of the mineral supplement was lost to snow, water, or wind during the testing period. An important feature of the apparatus is its robustness, which was demonstrated during the testing period. Large animals such as cattle weighing 2000 pounds or more are prone to rubbing against structures to scratch themselves. Such rubbing by the animals is encouraged in this case to draw the animals to the dispensing apparatus, but it may produce damage to structures if care is not taken to protect them. The present apparatus 20 with a smooth exterior and rugged construction experienced no damage from such rubbing. The animals are also naturally curious and will tend to play with objects. The dispensing assembly 48 of the apparatus 20 could be contacted only by the tongue of the feeding animal, which cannot itself exert sufficient force to cause damage to the interior mechanism. The larger width of the tongue opening 32 near the base 32a allowed the animal to extend its nose and tongue into the bottom of the housing to consume any granular material that had fallen there, but remained protected from the elements until consumed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. Apparatus for dispensing granulated edible material to an animal upon demand by the animal, comprising:

a housing having a tongue opening in a side thereof, the tongue opening being sufficiently large to permit a tongue of the animal to extend therethrough;

a bin within the housing;

a downwardly oriented chute in a bottom of the bin; and a dispensing assembly that is actuated by the animal, comprising:

a stopper assembly including a stopper sized to close the chute when the stopper assembly is in a first position and to allow granulated edible material to flow through the chute when the stopper assembly is in a second position, and an actuating block affixed to the stopper assembly such that the actuating block is accessible to the tongue of the animal when the tongue extends through the opening in the housing and the tongue may move the actuating block such that the stopper assembly moves from the first position to the second position.

2. The apparatus of claim 1, wherein the first position is vertically lower than the second position.

3. The apparatus of claim 1, further including a dispensing stop located above the chute, the movement of the stopper assembly being limited by the dispensing stop.

4. The apparatus of claim 3, wherein the dispensing stop comprises a top support, a stop rod extending downwardly from the top support and vertically aligned with the stopper assembly, and an engagement between the stop rod and the top support.

5. The apparatus of claim 4, wherein the engagement is adjustable so that the stop rod may be adjusted upwardly or downwardly.

6. The apparatus of claim 1, wherein the actuating block comprises
   a recess in an upper side thereof, the recess being positioned to receive the granulated edible material which falls through the chute, and
   a flow passage extending from the recess, through an interior of the actuating block, and to an exterior opening in the actuating block.

7. The apparatus of claim 1, further including
   a restraint which prevents the actuating block from rotating about a vertical axis.

8. The apparatus of claim 1, further including
   an external support to which the housing is affixed.

9. Apparatus for dispensing granulated edible material to an animal, comprising:
   a housing having a tongue opening in a side thereof, the tongue opening being sufficiently large to permit a tongue of the animal to extend therethrough;
   a bin within the housing;
   a downwardly oriented chute in a bottom of the bin;
   a dispensing stop; and
   a dispensing assembly, comprising:
      a dispensing rod extending through the chute and having an upper end adjacent to the dispensing stop, the dispensing rod being free to move between a first position whereat the dispensing rod does not contact the dispensing stop, and a second position whereat the dispensing rod contacts the dispensing stop,
      a stopper affixed to the dispensing rod, the stopper being sized to close the chute when the dispensing rod is in the first position and to allow granulated edible material to flow from the bin through the chute when the dispensing rod is in the second position, and
      an actuating block affixed to a lower end of the dispensing rod at a location whereat the actuating block is accessible to the tongue of the animal when the tongue extends through the opening in the housing and the tongue may move the actuating block such that the dispensing rod moves from the first position to the second position.

10. The apparatus of claim 9, wherein the dispensing stop permits the dispensing rod to move vertically between a lowered first position and a raised second position.

11. The apparatus of claim 9, wherein the dispensing stop comprises
    a top support,
    a stop rod extending downwardly from the top support, and
    an engagement between the stop rod and the top support.

12. The apparatus of claim 11, wherein the engagement is adjustable so that the stop rod may be adjusted upwardly or downwardly.

13. The apparatus of claim 11, wherein the engagement includes
    an upper nut threadably affixed to the stop rod at a location above the top support, and
    a lower nut threadably affixed to the stop rod at a location below the top support.

14. The apparatus of claim 9, wherein the actuating block comprises
    a recess in an upper side thereof, the recess being positioned to receive the granulated edible material as it falls through the chute, and
    a flow passage extending from the recess, through the interior of the actuating block, and to an exterior opening in the actuating block.

15. The apparatus of claim 9, further including
    a restraining link extending between an inside surface of the housing and the actuating block, the restraining link preventing the actuating block from rotating about a vertical axis.

16. The apparatus of claim 9, wherein the tongue opening has a truncated triangular shape.

17. The apparatus of claim 9, further including
    an external support to which the housing is affixed.

18. Apparatus for dispensing granulated edible material to an animal, comprising:
    a housing having a tongue opening in a side thereof, the tongue opening being sufficiently large to permit a tongue of the animal to extend therethrough;
    a bin within the housing;
    a downwardly oriented chute in a bottom of the bin;
    a vertically adjustable dispensing stop located above the chute; and
    a dispensing assembly, comprising:
       a dispensing rod extending through the chute and having an upper end adjacent to the dispensing stop, the dispensing rod being free to move between a first lowered position whereat the dispensing rod does not contact the dispensing stop, and a second raised position whereat the dispensing rod contacts the dispensing stop,
       a stopper affixed to the dispensing rod, the stopper being sized to close the chute when the dispensing rod is in the first position and to allow granulated edible material to flow through the chute when the dispensing rod is in the second position, and
       an actuating block affixed to a lower end of the dispensing rod at a location whereat the actuating block is accessible to the tongue of the animal when the tongue extends through the opening in the housing and the tongue may move the actuating block such that the dispensing rod moves from the first position to the second position, wherein the actuating block comprises a recess in an upper side thereof, the recess being positioned to receive the granulated edible material as it falls through the chute, and a flow passage extending from the recess, through the interior of the actuating block, and to an exterior opening in the actuating block.

19. The apparatus of claim 18, further including
    a restraining link extending between an inside surface of the housing and the actuating block, the restraining link preventing the actuating block from rotating about a vertical axis.

20. The apparatus of claim 18, further including
    an external support to which the housing is affixed.

* * * * *